Dec. 9, 1930.  G. M. GRISWOLD  1,784,064
CHALK LINE REEL
Filed July 31, 1928
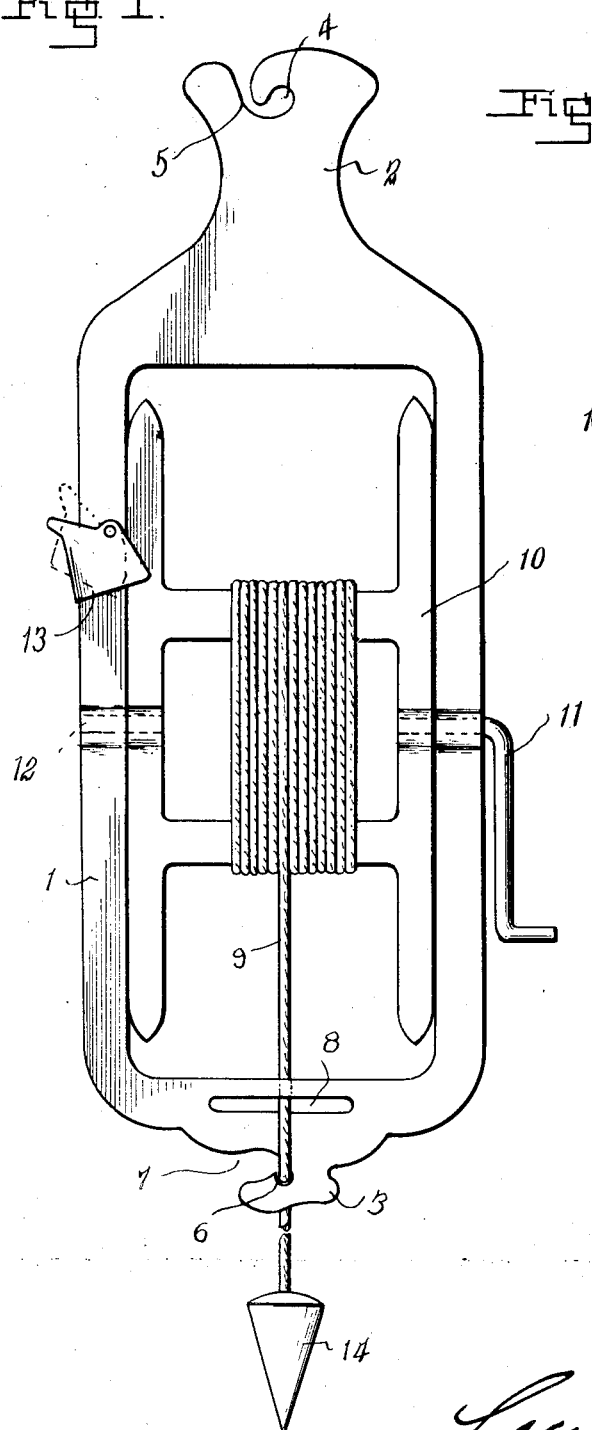
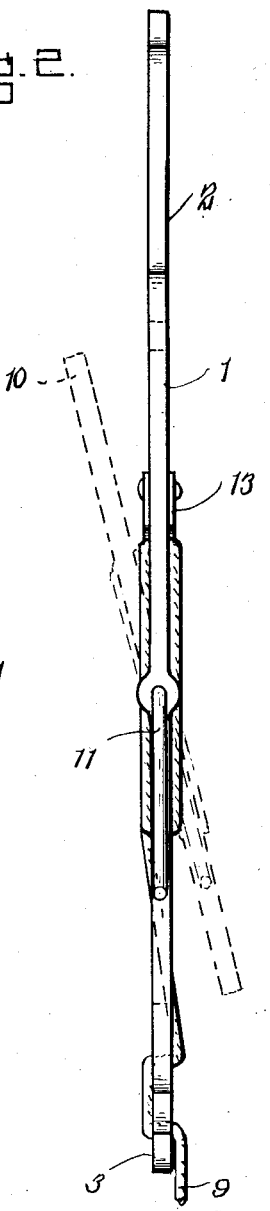
INVENTOR.
G. M. Griswold
BY
Lacey & Lacey, ATTORNEYS Patented Dec. 9, 1930

1,784,064

UNITED STATES PATENT OFFICE

GEORGE M. GRISWOLD, OF DENVER, COLORADO

CHALK-LINE REEL

Application filed July 31, 1928. Serial No. 296,442.

This invention relates to a line holder and provides a device particularly adapted for the use of mechanics for leveling, lining and plumbing work, and which is compact and adapted to be readily and conveniently handled, and which secures the line in the desired adjusted position.

The device comprises essentially two parts, a reel and a frame, each being a one-piece structure for economical manufacture and assemblage.

While the drawing illustrates a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had in the following description and the drawing hereto attached, in which:—

Figure 1 is an elevational view of a chalk line holder embodying the invention and adapted for use as a plumb.

Figure 2 is an edge view, the dotted lines indicating an adjusted position of the reel.

Corresponding and like parts are referred to in the following description and designated in both views of the drawing by like reference characters.

The numeral 1 denotes an oblong frame having terminal extensions 2 and 3. The extension 2 is formed with an eye 4 from which extends a passage 5. The extension 3 is formed with an eye 6 from which extends a passage 7.

A transverse slot 8 is formed in the frame adjacent the extension 3. The eye 4 is adapted to receive a nail or other part to which the device may be attached when in service. The passage 5 provides ingress and egress for the part adapted to be received in the eye 4. The eye 6 is adapted to receive and center the line 9. The frame is flat and may be formed in any manner and of any suitable material.

The reel frame is flat and may be constructed in any determinate way and fits snugly between the side bars of the frame 1. The reel 10 is pivotally connected to the frame 1 by means of a crank 11 and a pin 12. A suitable catch 13 pivoted to the side bar of the frame 1 is adapted to engage a side bar of the reel 10 and hold the latter in the plane of the frame to prevent the unwinding of the line 9 therefrom. In the preferable construction, the catch comprises side elements and a cross piece, the side elements engaging opposite faces of the main and reel frames to hold them in the same plane and the cross piece forming a stop and finger piece. When the catch 13 is adjusted to the dotted line position appearing in Figure 1, the reel 10 is free to rotate to admit of unwinding the line 9 therefrom, or to wind the line thereon by turning the crank 11. When it is required to use the device as a plumb the bob 14 is attached to the outer end of the line 9, the latter being engaged with the eye 6.

The extension 2 may be engaged with suitable supporting means, which enters the eye 4. When the device is adapted for use as a chalk line the frame 1 is attached at one end of the part to be marked and the line 9 is made fast in any determinate way at the opposite end of the part to be marked and after the line has been chalked and drawn taut it is snapped in the usual way to mark the work. For leveling and lining brick work and masonry generally the line 9 is partly unwound and made secure at the ends of the work or structure in any determinate way. The reel and frame being flat occupy a minimum space and result in the provision of a light and compact structure, which may be economically manufactured.

Having thus described the invention, I claim:—

1. A line holder comprising an oblong flat frame, having flat terminal extensions, in which are formed eyes and passages leading outwardly from the eyes, an end bar of the frame having a transverse slot formed therein, a flat reel fitted within the frame, a pin and a crank pivotally connecting the reel to the frame, and a catch mounted upon the frame and comprising side elements engageable with opposite faces of the reel and frame and a cross piece forming a stop and finger piece.

2. A line holder comprising an oblong flat frame provided at opposite ends with outwardly disposed integral flat extensions in which are formed openings and lateral passages, and having a transverse slot in an end, a flat reel mounted in the side members of the frame, and a catch mounted on the frame and adapted to embrace opposite sides of the frame and reel and provided with a stop and finger piece, the opening in one of the extensions being adapted to receive an attaching element and the opening in the opposite extension serving to center the line after passing through the adjacent transverse slot.

In testimony whereof I affix my signature.

GEORGE M. GRISWOLD. [L. S.]